March 29, 1927.

J. ROZIČ

1,622,975

COOKING KETTLE

Filed June 16, 1926

INVENTOR
Joseph Rozič
BY
ATTORNEY

Patented Mar. 29, 1927.

UNITED STATES PATENT OFFICE.

JOSEPH ROZIČ, OF PALMERTON, PENNSYLVANIA.

COOKING KETTLE.

Application filed June 16, 1926. Serial No. 116,302.

This invention relates generally to cooking kettles used for boiling milk or cooking food and the like, the invention having more particular reference to a novel type of cooking kettle.

The invention has for an object the provision of an improved cooking kettle of novel construction and arrangement of parts.

For further comprehension of the invention, and of the objects and advantages thereof, reference will be had to the following description and accompanying drawing, and to the appended claims in which the various novel features of the invention are more particularly set forth.

Fig. 1 of the drawing is a perspective view of my improved cooking kettle.

Figure 1:
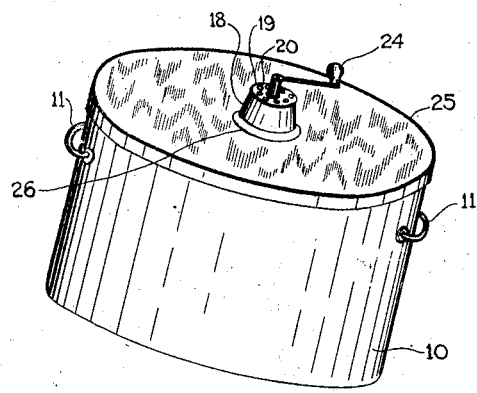
Figure 2:
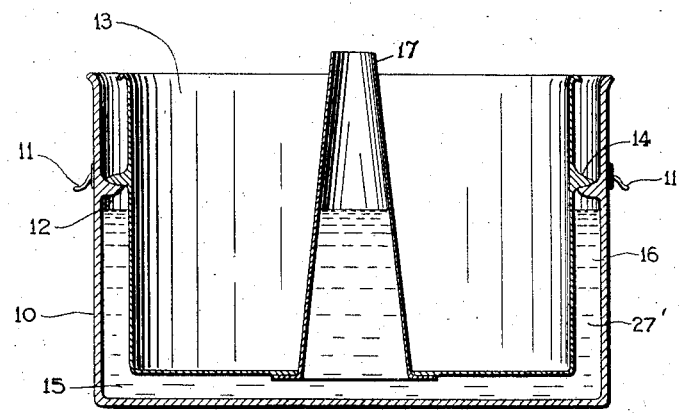
Fig. 2 is an enlarged vertical central sectional view thereof.
Figure 3:
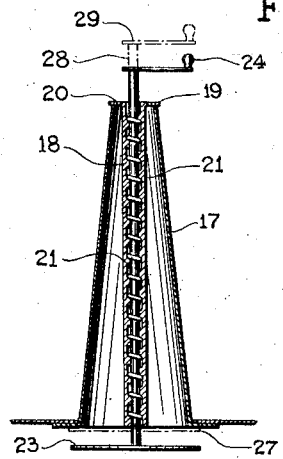
Fig. 3 shows the adjusting device for the escaping steam.

As here embodied my improved cooking kettle comprises a container 10, of any suitable shape, preferably oval, consisting of a bottom with a side element, having attached thereto handles 11, and provided with an inner ring member 12, attached thereto, and extending inwardly therefrom, at or near the upper extremity of the container 10.

The inner container 13, shaped similar to the above described container 10, is of somewhat smaller dimensions, and is adapted to fit inside the container 10, and is provided with an outer ring member 14 attached thereto and extending outwardly therefrom, at or near the upper extremity of the inner container 13. The above described construction being such as will permit the said outer ring member 14 and the inner ring member 12 to limit the engagement of the inner container 13 in the container 10, so as to provide a space 15 and 16, at the bottom and sides, respectively, of the container 10.

The frusto-conical shaped member 17 is attached at its lower extremity to the bottom of the inner container 13, and is positioned at the center thereof, and extends vertically therefrom above the upper extremity of the container 10. It being understood that the bottom of the container 10 has formed or cut therein a central circular aperture to permit the said frusto-conical shaped member 17 to be attached thereto.

The hollow tubular member 18 has attached at its upper extremity a flanged member 19 provided with apertures 20. The hollow tubular member 18 is positioned in the center of the frusto-conical shaped member 17 and extends downward therefrom flush with the lower extremity of the frusto-conical shaped member 17. The flanged member 19 is attached, at its outer periphery to the upper extremity of the frusto-conical shaped member 17.

The hollow tubular member 18 has formed or cut in its inner periphery a thread which engages with a thread formed or cut on the outer periphery of the rod 22. The rod 22 is positioned in the hollow tubular member 18 and has attached at its lower extremity a plate 23, circular shaped. The handle 24 is attached to the upper extremity of the rod 22. The cover 25 is adapted to enclose, or cover the upper open extremity of the inner container 13, and is provided with a central aperture 26 to permit the upper extremity of the frusto-conical shaped member 18 to extend through the cover 25.

The above described construction being such as will permit the plate 23 to close the lower extremity of the frusto-conical shaped member 18 by rotating the handle 24, so as to prevent the escape of steam when the water designated by the reference numeral 27' placed in the container 10 is heated to a boiling point, at which time the plate 23, the rod 21 and the handle 24 will assume the positions designated by the reference numerals 27, 28 and 29 respectively. It being understood that the food to be cooked or boiled will be placed in the inner container 13.

It is obvious that I have provided a means of determining when the above mentioned water has been brought to a boiling point, as steam will appear through the apertures 20, so that the fire may be properly regulated so as not to waste fuel. It is also obvious that I have provided a means of preventing the further escape of the said steam, so as not to lose the heat value of the said steam.

While I have above described the preferred form, construction, and arrangement of the several elements employed it will be understood that the device is, nevertheless, susceptible of considerable modification therein, and therefore reserve the privilege of resorting to all such changes as may be fairly embodied within the spirit and scope of the invention as claimed.

Having thus described my invention, what

I claim as new and desire to protect by Letters Patent of the United States is as follows:—

1. In a cooking kettle, in combination with an outer and an inner container arranged to have a space between the bottoms and sides thereof, a frusto conical shaped member attached at its lower extremity to the bottom of the inner container, and positioned at the center thereof and extending vertically therefrom above the upper extremity of the said container, the bottom of the said inner container having cut therein a central circular aperture to permit the said frusto conical shaped member to be attached thereto, a hollow tubular member attached at its upper extremity to a flanged member provided with apertures, the said hollow tubular member positioned in the center of the frusto conical shaped member and extending downward therefrom flush with the lower extremity of the said frusto conical shaped member, the said flanged member attached to the upper extremity of the said frusto conical shaped member, threads on the inner periphery of said tubular member engaging with a thread cut on the outer periphery of a rod, the said rod positioned in the said hollow tubular member, a plate attached to the lower extremity of the said rod, a handle attached to the upper extremity of the said rod, so as to permit the said plate to close the lower extremity of the frusto conical shaped member by rotating the said handle.

2. In a cooking kettle, in combination with an outer and an inner container arranged to have a space between the bottoms and sides thereof, a frusto conical shaped member attached at its lower extremity, to the bottom of the inner container, and positioned at the center thereof and extending vertically therefrom above the upper extremity of the said container, the bottom of the said inner container having cut therein a central circular aperture to permit the said frusto conical shaped member to be attached thereto, a hollow tubular member attached at its upper extremity to a flanged member provided with apertures, the said hollow tubular member positioned in the center of the frusto conical shaped member and extending downward therefrom flush with the lower extremity of the said frusto conical shaped member, the said flanged member attached to the upper extremity of the said frusto conical shaped member, threads on the inner periphery of said tubular member engaging with a thread cut on the outer periphery of a rod, the said rod positioned in the said hollow tubular member, a plate attached to the lower extremity of the said rod, manually rotatable means attached to the upper extremity of the said rod, so as to permit the said plate to close the lower extremity of the frusto conical shaped member.

3. In a cooking kettle, in combination with an outer and an inner container arranged to have a space between the bottoms and sides thereof, a frusto conical shaped member attached at its lower extremity to the bottom of the inner container, and positioned at the center thereof and extending vertically therefrom above the upper extremity of the said container, the bottom of the said inner container having cut therein a central circular aperture to permit the said frusto conical shaped member to be attached thereto, a hollow tubular member attached at its upper extremity to a flanged member provided with apertures, the said hollow tubular member positioned in the center of the frusto conical shaped member and extending downward therefrom flush with the lower extremity of the said frusto conical shaped member, the said flanged member attached to the upper extremity of the said frusto conical shaped member, threads on the inner periphery of said tubular member engaging with a thread cut on the outer periphery of a rod, the said rod positioned in the said hollow tubular member, means for covering the lower extremity of the frusto conical shaped member being attached to the lower extremity of the said rod, a handle attached to the upper extremity of the said rod, so as to permit the said covering means to close the lower extremity of the frusto conical shaped member by rotating the said handle.

4. In a cooking kettle of the class described a container having attached thereto handles, and provided with an inner ring member attached thereto and extending inwardly therefrom, an inner container adapted to fit inside the said container, and provided with an outer ring member attached thereto and extending outwardly therefrom, so as to permit the said outer ring member and the said inner ring member to limit the insertion of the said inner container into the said outer container, so as to provide a space between the bottoms and sides of the said containers, a frusto-conical shaped member attached at its lower extremity to the bottom of an inner container, and positioned at the center thereof and extending vertically therefrom above the upper extremity of the said container, the bottom of the said inner container having cut therein a central circular aperture to permit the said frusto-conical shaped member to be attached thereto, a hollow tubular member attached at its upper extremity to a flanged member provided with apertures, the said hollow tubular member positioned in the center of the frusto-conical shaped member and extending downward therefrom flush with the lower extremity of the said frusto-conical shaped member, the said flanged member attached to the upper extremity of the said frusto-conical shaped member, threads on the inner periphery of said tubular member engaging with a thread cut on the outer periphery of a rod, the said rod positioned in the said hollow tubular member, a plate attached to the lower extremity of the said rod, a handle attached to the upper extremity of the said rod, so as to permit the said plate to close the lower extremity of the frusto-conical shaped member by rotating the said handle.

In testimony whereof I have affixed my signature.

JOSEPH ROZIČ.